United States Patent
Lahrman

(10) Patent No.: US 8,986,465 B2
(45) Date of Patent: Mar. 24, 2015

(54) PISTON RING WITH LOCALIZED NITRIDED COATING

(71) Applicant: Mahle International GmbH, Stuttgart (DE)

(72) Inventor: John C. Lahrman, Muskegon, MI (US)

(73) Assignee: Mahle Industries Inc., Farmington Hills, MI (US)

( * ) Notice: Subject to any disclaimer, the term of this patent is extended or adjusted under 35 U.S.C. 154(b) by 0 days.

(21) Appl. No.: 13/741,814

(22) Filed: Jan. 15, 2013

(65) Prior Publication Data

US 2014/0197602 A1    Jul. 17, 2014

(51) Int. Cl.
*F16J 9/26* (2006.01)
*F16J 9/20* (2006.01)

(52) U.S. Cl.
CPC ..... *F16J 9/26* (2013.01); *F16J 9/20* (2013.01)
USPC ............................. 148/217; 277/443; 277/442

(58) Field of Classification Search
CPC ....................................... F16J 9/26; F16J 9/28
USPC .............................. 277/434, 442, 443; 148/217
See application file for complete search history.

(56) References Cited

U.S. PATENT DOCUMENTS

| | | | |
|---|---|---|---|
| 7,871,078 B2 * | 1/2011 | Fischer et al. | 277/442 |
| 8,235,393 B2 * | 8/2012 | Esser et al. | 277/440 |
| 8,820,750 B2 | 9/2014 | Chiba et al. | |
| 2010/0044967 A1 * | 2/2010 | Esser et al. | 277/442 |
| 2010/0187765 A1 * | 7/2010 | Hoppe et al. | 277/443 |

FOREIGN PATENT DOCUMENTS

| | | |
|---|---|---|
| DE | 19940022 A1 | 3/2000 |
| DE | 102006003480 B3 | 7/2007 |
| DE | 102012002447 A1 | 11/2012 |
| EP | 1132663 A2 | 9/2001 |
| WO | WO-03/098079 A1 | 11/2003 |
| WO | WO-2011/151927 A1 | 12/2011 |
| WO | WO-2012/045294 A1 | 4/2012 |

OTHER PUBLICATIONS

English abstract for DE-102006003480.
English abstract for DE-19940022.
English abstract for DE-102012002447.
International Search Report for PCT/US2014/016637, mailed Nov. 3, 2014.

* cited by examiner

*Primary Examiner* — Gilbert Lee
(74) *Attorney, Agent, or Firm* — Rader, Fishman PLLC

(57) ABSTRACT

A piston ring comprising upper face, a lower face, an inner perimeter wall, and an outer perimeter wall that extends around the piston ring from the upper face to the lower face, where the outer perimeter wall has upper corner region disposed adjacent the upper face, a lower corner region disposed adjacent the lower face, and a band of a nitrided conversion layer extending between the upper corner region and the lower corner region, and where a PVD nitride layer is disposed on the upper corner region and on the lower corner region.

9 Claims, 2 Drawing Sheets

PISTON RING WITH LOCALIZED NITRIDED COATING

BACKGROUND

Power cylinder assemblies of internal combustion engines generally comprise reciprocating pistons disposed within a cylindrical cavity, or cylinder, that has one closed end and one open end. The upper end or crown of the piston, together with the closed end of the cylinder, define a combustion chamber, where the fuel combustion takes place.

Many pistons for use with internal combustion engines have three piston rings, each located in an annular groove defined in the end of the wall of the piston near the crown. The two piston rings closest to the crown are known as compression rings. The uppermost compression ring seals the combustion chamber from leakage during combustion of the air-fuel mixture, and transfers heat from the combustion chamber to the cylinder wall. Of the three piston rings, the upper compression ring operates in the harshest environment in terms of pressure, temperature and minimal lubrication.

The upper compression ring in a piston is generally a split ring. It is compressed to fit within the cylinder. When the engine is operating, the pistons and piston rings are subjected to extremely harsh conditions, including high pressures and temperatures, and repeated rapid reciprocal movements. As the piston moves within the cylinder the piston rings are in contact with, and move up and down against, the cylinder walls. The reciprocating motion of the pistons and the piston rings within the cylinders, along with the high operating pressures and temperatures, can subject the piston rings to wear and possible failure. Since piston rings are difficult to access when the piston is in place in an internal combustion engine, replacing a piston ring may be very expensive and time consuming. Therefore, it is important that the piston rings be durable and resistant to scuffing and wear.

To increase the durability of piston rings and to enable piston rings to withstand the harsh conditions to which they are subjected, very hard materials may be used to coat the outer perimeter of piston rings. Compression rings, which may see the highest temperatures and pressures, are often coated with chromium nitride, or a similar hard coating to increase durability. This hard, outer coating may be applied by physical vapor deposition (PVD), or by other known mechanisms.

The hard coating on the piston ring is deposited directly on the relatively soft substrate material of the piston ring, thereby creating a steep transition in hardness between the layers. This may lead to an increased risk of cracking in the hard outer layer of the piston ring. Furthermore, the coating material may be brittle and therefore prone to cracking, especially at the outer corners of the ring. Once cracks start to form in a piston ring, they may propagate, and can ultimately lead to breakage and failure of the piston ring A ductile surface at the outer corners of a piston ring may increase the durability of the rings. However, it is also important to retain the hard surface on the remainder of the outer circumference of the piston ring to reduce wear.

BRIEF DESCRIPTION OF THE DRAWINGS

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description. Exemplary illustrations are described in detail by referring to the drawings as follows:

DETAILED DESCRIPTION

Figure 1:
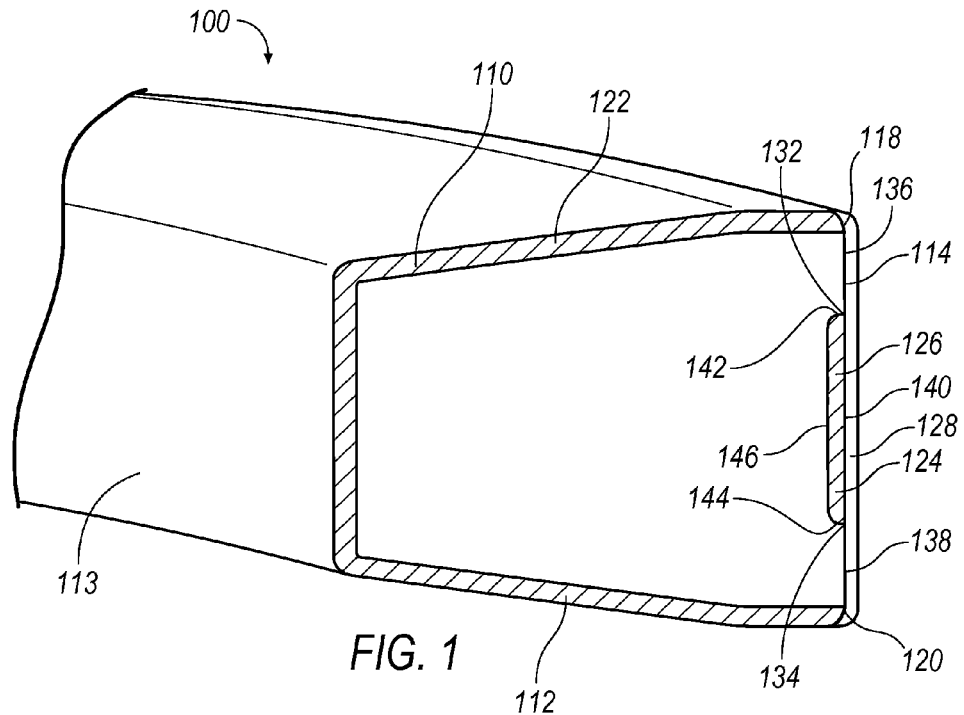
FIG. 1 is a perspective view of a portion of an exemplary piston ring, manufactured using the disclosed process.

Referring to FIG. 1, a piston ring 100 is a generally annular split ring, with an upper face 110, a lower face 112, an inner perimeter wall 113, and an outer perimeter wall 114. Outer perimeter wall 114 extends around the outer circumference of piston ring 100 from upper face 110 to lower face 112 of piston ring 100. The upper corner 118 of piston ring 100 extends along the length of outer perimeter wall 114 of piston ring 100, and is defined by the juncture of outer perimeter wall 114 and upper face 110 of piston ring 100. Similarly, the lower corner 120 of piston ring 100 extends along outer perimeter wall 114 of piston ring 100 and is defined by the juncture of outer perimeter wall 114 and lower face 112 of piston ring 100.

Nitrided conversion layer 122 may enclose much of the exterior surface of piston ring 100, including inner perimeter wall 113, upper face 110, and lower face 112, of piston ring 100. A band 124 of nitrided conversion layer 122 may extend along the length of outer perimeter wall 114 of piston ring 100. Band 124 of conversion layer 122 has an upper edge 132 and a lower edge 134, both of which may extend along the length of outer perimeter wall 114 along the boundary between band 124 of conversion layer 122 and outer perimeter wall 114 of piston ring 100. Band 124 may have an exterior surface 140 that is generally coplanar with outer perimeter wall 114. Band 124 of conversion layer 122 may have a top surface 142, and a bottom surface, 144, both generally perpendicular to outer perimeter wall 114, and a circumferential surface 146 that is generally parallel to outer perimeter wall 114.

Nitrided conversion layer 122 may be formed by exposing piston ring 100 to dissociated ammonia for a specified time at an elevated temperature, or by any other suitable means. Conversion layer 122 may form on all the exposed surfaces of piston ring 100. When conversion layer 122 is formed by exposure to dissociated ammonia gas, chromium is necessary. Therefore, to facilitate the formation of conversion layer 122, piston ring 100 may be made of chromium-bearing stainless steel. Although piston rings can be made of other materials, including cast iron, gray iron, and others, those materials may be unsuitable for this nitriding process, as they do not contain appreciable amounts of chromium. During the process of forming the conversion layer, the nitrogen in the dissociated ammonia gas penetrates the exterior layers of the stainless steel of piston ring 100, converting some of the chromium in the stainless steel to a nitride, thereby creating a hardened nitrided conversion layer 122. When initially formed, conversion layer 122 is of a generally uniform thickness on all exterior surfaces of piston ring 100.

The stainless steel chosen may have between approximately ten percent (10%) and eighteen percent (18%) chromium to ensure there is enough chromium to produce a sufficiently thick and durable nitrided conversion layer. The piston ring may be made of stainless steels in the martensitic class, and especially from alloys in the 440 series of stainless steels. The conversion layer 122 resulting from nitriding the piston ring 100 may have a Rockwell hardness of approximately sixty-five (65) or more. Although conversion layer 122 is very hard, it is also brittle, and may crack or break when subjected to stress.

In one exemplary illustration of piston ring 100, an upper corner region 136 of piston ring 100 may extend along the length of outer perimeter wall 114 of piston ring 100 from upper corner 118 of piston ring 100 to upper edge 132 of band 124 of conversion layer 122. Similarly, a lower corner region 138 of piston ring 100 may extend along the length of outer perimeter wall 114 of piston ring 100 from lower corner 120 of piston ring 100 to lower edge 134 of band 124 of conversion layer 122.

A nitride layer 128, deposited by physical vapor deposition (PVD), may cover outer perimeter wall 114 and band 124 of conversion layer 122, including upper corner region 136 and lower corner region 138, and may extend along the outer circumference of piston ring 100 from upper corner 118 to lower corner 120 of outer perimeter wall 114. PVD nitride layer 128 may extend a short distance onto upper face 110 and lower face 112, over conversion layer 122.

Since conversion layer 122 may be brittle and prone to cracking, conversion layer 122 does not extend over upper and lower corner regions 136, 138 of outer perimeter wall 114, thereby reducing the possibility of cracking in the upper and lower corner regions 136, 138 of piston ring 100. Instead, in upper and lower corner regions 136, 138, PVD nitride layer 128 rests directly on the substrate material of piston ring 100. In the central portion of outer perimeter wall 114 between upper and lower corner regions 136, 138 and extending along the perimeter of outer perimeter wall 114, band 124 of conversion layer 122 provides a hard coating, thereby enabling piston ring 100 to resist wear.

An annular cavity 126 may be present in the outer perimeter wall 114 of the original material or wire from which piston ring 100 is originally made. Alternatively, annular cavity 126 may be ground or machined into outer perimeter wall 114 of piston ring 100 after piston ring has been formed. Annular cavity 126 may extend along the length of outer perimeter wall 114 between upper and lower corner regions 136, 138. Conversion layer 122 forms in a generally uniform thickness over the outer surfaces of piston ring 100, including upper and lower corner regions 136, 138 and in the region surrounding annular cavity 126.

After conversion layer 122 has been disposed on the outer surfaces of piston ring 100, a second grinding or machining process may be performed. During the second grinding or machining process, conversion layer 122 may be removed from upper and lower corner regions 136, 138, leaving a band 124 of conversion layer 122 between upper and lower corner regions 136, 138. The band 124 of conversion layer 122 may be reduced in thickness during the second grinding.

Outer perimeter wall 114 may have been ground into a profile during the second grinding. Generally, outer perimeter wall 114 will have a slightly rounded or so-called barrel profile, with the central portion of outer perimeter wall 114 extending generally outward from the upper and lower corners 118, 120. Outer perimeter wall 114 may be rounded symmetrically ("symmetric barrel") or it may be rounded asymmetrically ("asymmetric barrel"), with lower corner 120 extending slightly further from inner perimeter wall 113 of piston ring 100 than upper corner 118. Other shaped profiles are also possible, such as a taper face.

Once the second grinding has been completed, the exterior surface 140 of band 124 of conversion layer 122 may be generally coplanar with the portions of upper and lower corner regions 136, 138 that extend along outer perimeter wall 114 of piston ring 100.

A nitride layer 128 may be deposited by physical vapor deposition (PVD) on outer perimeter wall 114, including on the exterior surface 140 of band 124 of conversion layer 122 and on upper and lower corner regions 136, 138. If outer perimeter wall 114 has a slightly contoured profile, PVD nitride layer 128 on outer perimeter wall 114 will have the same contour. PVD nitride layer 128 may be chromium nitride, titanium nitride, or any other suitable nitride compound. PVD nitride layer 128 may extend a slight amount around both upper and lower corners 118, 120, onto conversion layer 122 on upper face 110 and on lower face 112 of piston ring 100. PVD nitride layer 128 is disposed directly on stainless steel substrate of piston ring 100 at upper and lower corner regions 136, 138, of outer perimeter wall 114, and on exterior surface 140 of band 124 of conversion layer 122 in outer perimeter wall 114. PVD nitride layer 128 may be thinner than conversion layer 122. PVD nitride layer 128 is also resistant to wear and may increase durability of piston ring 100 by reducing wear on outer perimeter wall 114 of piston ring 100.

Figure 2:
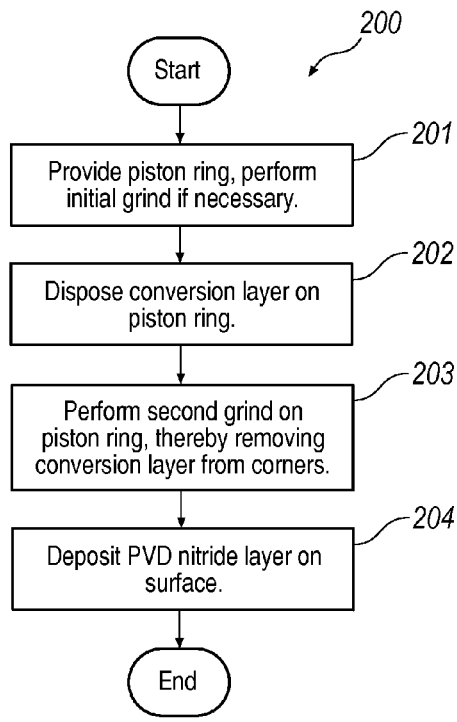
FIG. 2 is a flow chart describing the steps used in the manufacture of an exemplary piston ring.
Figure 3:
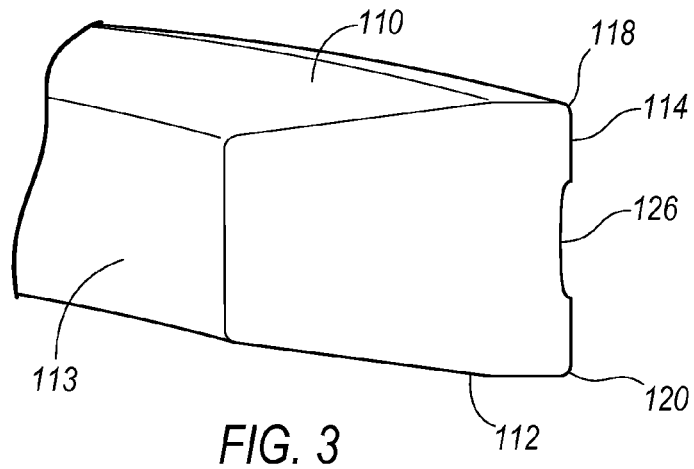
FIG. 3 is a perspective view of a portion of an exemplary piston ring manufactured using the disclosed process, showing the annular cavity in the face of the outer perimeter wall of the piston ring.

Referring now to FIG. 2, to manufacture the exemplary piston ring described herein, a piston ring 100 is provided. Piston ring 100 may be of a stainless steel. An initial grinding may be performed on outer perimeter wall 114 of piston ring 100, as described in block 201 to form annular cavity 126. Alternatively, the wire which is used to manufacture piston ring 100 may have an annular cavity disposed within it. If an initial grinding is done on the outer perimeter wall, the upper and lower corner regions 136, 138 of piston ring 100 are left relatively intact during the initial grind, while the central portion is ground down and material removed, resulting in an outer perimeter wall 114 with an annular cavity 126 disposed between two raised portions, as shown in FIG. 3. Outer perimeter wall 114 may be ground to form a profile at this time.

Figure 4:
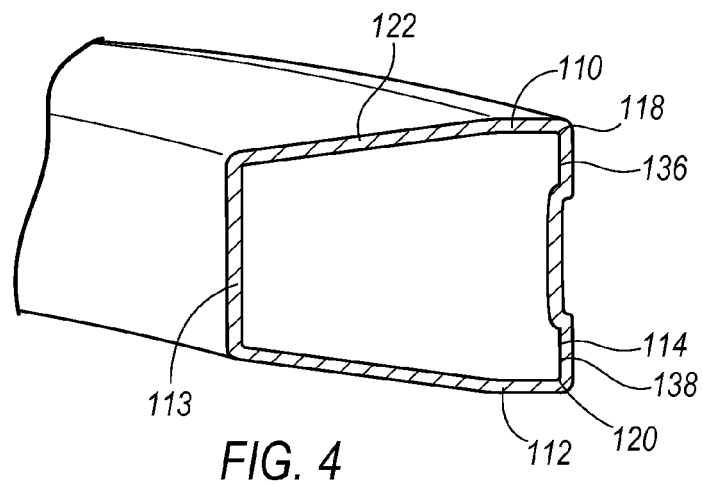
FIG. 4 is a perspective view of the exemplary piston ring of FIG. 3, after a nitrided conversion layer has been disposed on the piston ring but prior to a final grinding and deposition of a nitride layer by physical vapor deposition.

Once annular cavity has been disposed in the central portion of outer perimeter wall 114 of piston ring 100, leaving comparatively raised upper and lower corner regions 136, 138, a conversion layer 122 may be formed on outer surfaces of piston ring 100. Conversion layer 122 may be formed by nitriding the outer surfaces of piston ring by exposure to dissociated ammonia gas at elevated temperatures for an extended time period, or by any other conventional means, as described in block 202 of FIG. 2 and illustrated in FIG. 4. Conversion layer 122 may extend in a layer of generally uniform thickness on external surfaces of piston ring 100, including upper face 110, lower face 112, inner perimeter wall 113, and outer perimeter wall 114, including annular cavity 126 and comparatively raised upper and lower corner regions 136, 138.

After conversion layer 122 has been formed on piston ring 100, a second grind is done to piston ring 100, as described in block 203. The second grind removes a portion of conversion layer 122 from outer perimeter wall 114 of piston ring 100.

Figure 5:
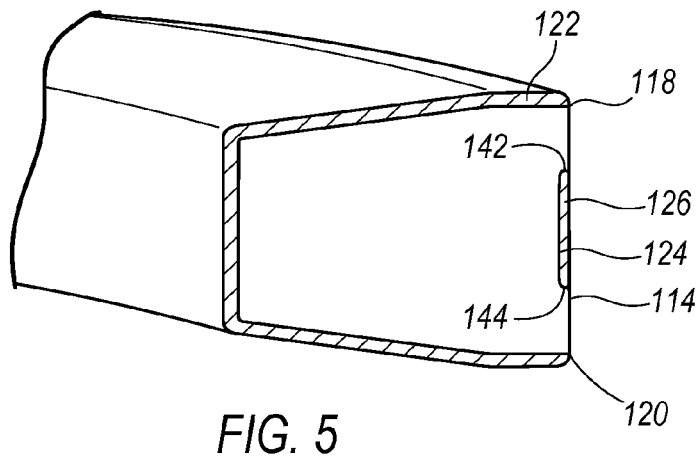
FIG. 5 is a perspective view of the exemplary piston ring of FIG. 4, after the second grinding has been performed on it, thereby removing the nitrided conversion layer from the corner regions.

The material removed in the second grind includes the portions of conversion layer 122 disposed in upper and lower corner regions 136, 138, and an outer layer of band 124 of conversion layer 122 disposed between upper and lower corner regions 136, 138. This grind may also form a slight profile on outer perimeter wall 114 of piston ring 100. As shown in FIG. 5, once the second grind has been completed, conversion layer 122 has been removed from upper and lower corner regions 136, 138 of piston ring 100 on outer perimeter wall 114, thereby exposing the base material of piston ring 100, while leaving a band 124 of conversion layer 122 between upper and lower corner regions 136, 138 in outer perimeter wall 114. This will allow PVD nitride layer 128 to be deposited directly on substrate material of piston ring 100 in upper and lower corner regions 136, 138, and be deposited on exterior surface 140 of band 124 of conversion layer 122 on outer perimeter wall 114. Portions of conversion layer 122 on upper face 110 and lower face 112 adjacent to upper and lower corners 118, 120 may be selectively removed during the second grind.

After the second grind has been done, band 124 of conversion layer 122 may be thinner than when it was initially formed. Exterior surface 140 of band 124 of conversion layer 122 may be generally coplanar with the portions of upper and lower corner regions 136, 138 that coincide with outer perimeter wall 114 of piston ring 100.

Once the second grind has been completed, a PVD nitride layer 128 is deposited on outer perimeter wall 114, as described in block 204 and illustrated in FIG. 1. PVD nitride layer 128 may be chromium nitride, titanium nitride, or any other suitable nitride compound. PVD nitride layer 128 extends from upper corner 118 to lower corner 120 of piston ring 100 along length of outer perimeter wall 114. PVD nitride layer 128 may also extend a distance past upper corner 118 into upper face 110 and a distance past lower corner 120 into lower face 112 of piston ring 100.

Band 124 of conversion layer 122 in outer perimeter wall 114 gives strength and wear resistance to outer perimeter wall 114 of piston ring 100, but does not cover upper and lower corner regions 136, 138, where a brittle layer such as a conversion layer may be prone to crack formation. PVD nitride layer 128 is deposited directly on substrate material of piston ring 100 in upper and lower corner regions 136, 138.

The finished piston ring 100 has an outer perimeter wall 114 with an upper and a lower corner region 136, 138 extending the length of outer perimeter wall 114. A band 124 of conversion layer 122 is disposed on the piston ring substrate between upper corner region 136 and lower corner region 138. PVD nitride layer 128 extends from upper corner 118 to lower corner 120 of outer perimeter wall 114 of piston ring 100, covering upper corner region 136, band 124 of PVD nitride layer 122, and lower corner region 138 of piston ring 100. PVD nitride layer 128 may also extend a short distance into upper face 110 and lower face 112 on top of nitrided conversion layer 122.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. It is anticipated and intended that future developments will occur in the arts discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of making a crack-resistant piston ring, comprising:
   providing a piston ring, wherein the piston ring has an upper face, a lower face, an inner perimeter wall, and an outer perimeter wall that extends around the piston ring from the upper face to the lower face; the outer perimeter wall having upper corner region disposed adjacent the upper face, a lower corner region disposed adjacent the lower face, and an annular cavity in the central portion of the outer perimeter wall extending between the upper corner region and the lower corner region along the length of the outer perimeter wall;
   forming a nitrided conversion layer penetrating an exterior layer of the piston ring;
   performing a grinding process on the outer perimeter wall, wherein the grinding process includes removing the nitrided conversion layer from the upper corner region and the lower corner region, thereby exposing the underlying piston ring in the upper corner region and the lower corner region forming a band of nitrided conversion layer between the upper corner region and the lower corner region; and
   depositing a PVD nitride layer on the outer perimeter wall of the piston ring.

2. The method of claim 1, wherein the piston ring is stainless steel.

3. The method of claim 1, further comprising performing a keystone grind on the upper face and the lower face of the piston ring.

4. The method of claim 1, wherein the PVD nitride layer is one of chromium nitride and titanium nitride.

5. The method of claim 1, wherein depositing the PVD nitride layer on the surface includes depositing the PVD nitride layer on the nitrided conversion layer disposed in the central portion of the piston ring between the upper and the lower corner regions, and on the underlying piston ring at the upper corner region and the lower corner regions of the piston ring.

6. The method of claim 1, further comprising forming one of a symmetric barrel profile and an asymmetric barrel profile on the PVD nitride layer.

7. The method of claim 1, wherein forming the nitrided conversion layer includes exposing the piston ring to a nitrogenous gas, thereby converting the exterior layer of the piston ring to a nitride.

8. The method of claim 1, wherein performing the grinding process includes removing an outer layer of the band of the nitrided conversion layer, and wherein an exterior surface of the band is generally coplanar with surfaces of the upper corner region and the lower corner region.

9. The method of claim 1, wherein performing the grinding process includes removing the nitrided conversion layer from the upper face and the lower face, thereby exposing the underlying piston ring.

* * * * *